US010619509B2

(12) United States Patent
Anderson

(10) Patent No.: US 10,619,509 B2
(45) Date of Patent: Apr. 14, 2020

(54) GAS TURBINE ENGINE FLOW MODULATION IN A ROTATING VANE

(71) Applicant: United Technologies Corporation, Farmington, CT (US)

(72) Inventor: Corey D. Anderson, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 49 days.

(21) Appl. No.: 15/965,130

(22) Filed: Apr. 27, 2018

(65) Prior Publication Data

US 2019/0330999 A1  Oct. 31, 2019

(51) Int. Cl.
F01D 17/16  (2006.01)

(52) U.S. Cl.
CPC ...... *F01D 17/162* (2013.01); *F05D 2220/323* (2013.01); *F05D 2240/12* (2013.01); *F05D 2260/221* (2013.01)

(58) Field of Classification Search
CPC ... F01D 9/06; F01D 9/02; F01D 25/12; F05D 2220/3212; F05D 2220/323; F05D 2240/12; F05D 2260/221
USPC .................................................. 251/206, 208
See application file for complete search history.

(56) References Cited

U.S. PATENT DOCUMENTS

| 3,123,283 | A | * | 3/1964 | Leis ....................... F01D 17/162 |
| | | | | 415/115 |
| 3,663,118 | A | * | 5/1972 | Johnson ................ F01D 17/162 |
| | | | | 415/116 |
| 4,169,692 | A | | 10/1979 | McDonough et al. |
| 4,214,851 | A | | 7/1980 | Tuley et al. |
| 9,670,797 | B2 | * | 6/2017 | Slavens ................... F01D 5/187 |
| 10,132,191 | B2 | | 11/2018 | Surace et al. |
| 2010/0202873 | A1 | | 8/2010 | Andrew |
| 2010/0290889 | A1 | | 11/2010 | Fedor |
| 2017/0226893 | A1 | | 8/2017 | Slavens et al. |
| 2017/0328379 | A1 | * | 11/2017 | Scholtes ................... F02K 3/04 |

FOREIGN PATENT DOCUMENTS

| EP | 2216508 A2 | 8/2010 |
| GB | 2019500 A | 10/1979 |
| WO | 2014052744 A1 | 4/2014 |
| WO | 2015026597 A1 | 2/2015 |

OTHER PUBLICATIONS

European Search Report dated Jul. 25, 2019 issued for corresponding European Patent Application No. 19170661.3.

* cited by examiner

*Primary Examiner* — Richard A Edgar
(74) *Attorney, Agent, or Firm* — Bachman & LaPointe, P.C.

(57) ABSTRACT

A variable vane system for a gas turbine engine includes an airfoil trunnion that extends through a vane platform such that the airfoil is rotatable with respect to the vane platform about an axis, the airfoil trunnion having an inlet configuration into the airfoil and a fixed airflow inlet mask to abut the airfoil trunnion, the fixed airflow inlet mask having a mask inlet configuration that modulates an airflow through the inlet configuration.

15 Claims, 8 Drawing Sheets

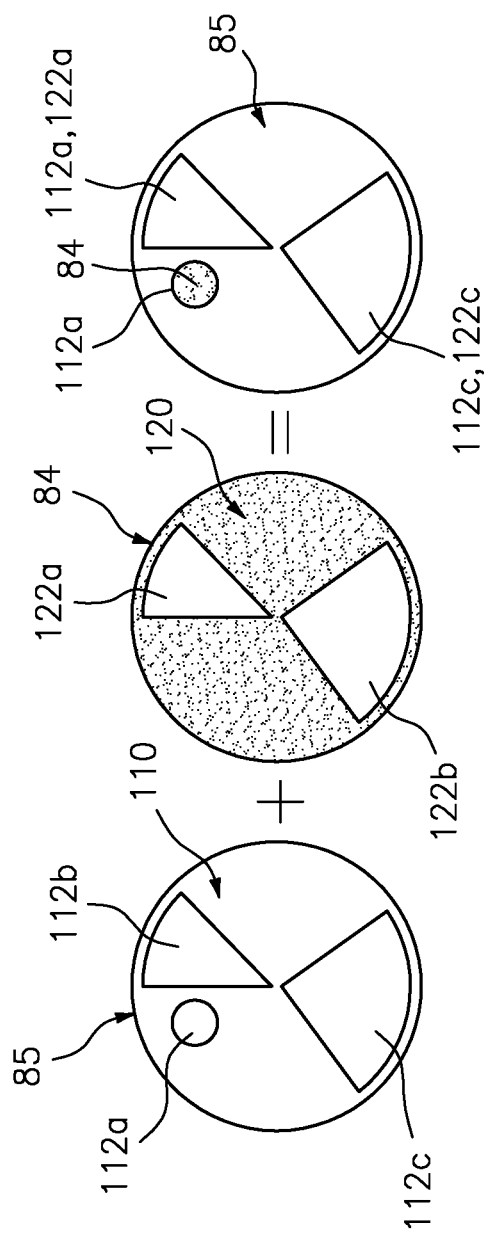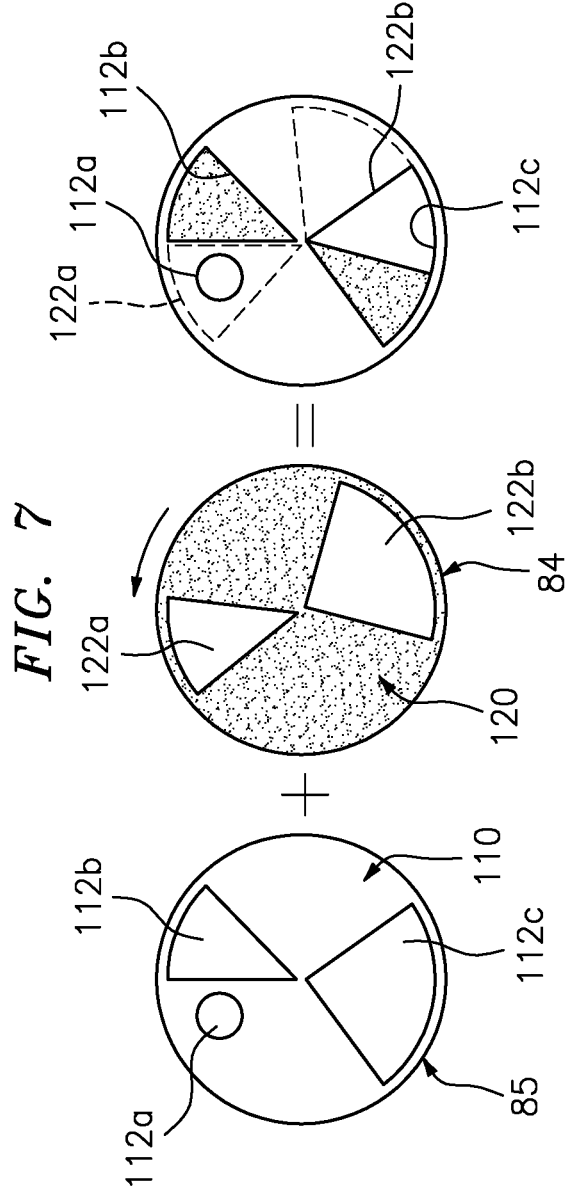
FIG. 7
FIG. 8

GAS TURBINE ENGINE FLOW MODULATION IN A ROTATING VANE

BACKGROUND

The present disclosure relates to a gas turbine engine and, more particularly, to a system and method of modulating an airflow into a variable vane system for a gas turbine engine.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

Some gas turbine engines include variable vanes that can be pivoted about their individual axes to change an operational performance characteristic. Rotating the vane airfoil at different performance points changes the characteristics of the flow and causes changes in pressure and external heat-transfer. These changes may have a negative impact on component life if not properly managed. Designing airfoil cooling to operate at some of the most challenging (durability) points can result in a component that is over-cooled at other flight points.

SUMMARY

A variable vane system for a gas turbine engine according to one disclosed non-limiting embodiment of the present disclosure includes an airfoil trunnion that extends from an airfoil through a vane platform such that the airfoil is rotatable with respect to the vane platform about an axis, the airfoil trunnion having a trunnion inlet configuration into the airfoil; and a fixed airflow inlet mask to abut the airfoil trunnion, the fixed airflow inlet mask having a mask inlet configuration, rotation of the airfoil rotates the trunnion inlet configuration with respect to the fixed airflow inlet mask to change an effective flow into the airfoil.

A further embodiment of any of the foregoing embodiments of the present disclosure includes a seal between the fixed airflow inlet mask and the airfoil trunnion.

A further embodiment of any of the foregoing embodiments of the present disclosure includes a multiple of inlets.

A further embodiment of any of the foregoing embodiments of the present disclosure includes a multiple of mask inlets.

A further embodiment of any of the foregoing embodiments of the present disclosure includes a multiple distinct inlets.

A further embodiment of any of the foregoing embodiments of the present disclosure includes that at least one of the effective flow inlet holes feeds a leading edge cavity.

A further embodiment of any of the foregoing embodiments of the present disclosure includes a trailing edge cavity.

A further embodiment of any of the foregoing embodiments of the present disclosure includes an airfoil cavity that ejects cooling flow to the gaspath via film cooling.

A further embodiment of any of the foregoing embodiments of the present disclosure includes a cooling cavity that provides airfoil cooling utilizing convective heat transfer.

A further embodiment of any of the foregoing embodiments of the present disclosure includes a rotor purge feed cavity.

A further embodiment of any of the foregoing embodiments of the present disclosure includes that the fixed airflow inlet mask extends from the vane platform.

A method of modulating an airflow into a variable vane system for a gas turbine engine, according to one disclosed non-limiting embodiment of the present disclosure includes rotating an airfoil with respect to a vane platform about an axis; and rotating a trunnion inlet configuration with respect to a fixed airflow inlet mask to change an effective flow into the airfoil in response to rotating the airfoil.

A further embodiment of any of the foregoing embodiments of the present disclosure includes rotating an airfoil trunnion that extends from the airfoil.

A further embodiment of any of the foregoing embodiments of the present disclosure includes rotating a unison ring connected to an arm, the arm connected to the trunnion.

A further embodiment of any of the foregoing embodiments of the present disclosure includes communicating airflow from the airfoil trunnion into one of a multiple of cavities within the airfoil.

A further embodiment of any of the foregoing embodiments of the present disclosure includes rotating the airfoil trunnion rotates the trunnion inlet configuration with respect to the fixed mask inlet configuration.

A further embodiment of any of the foregoing embodiments of the present disclosure includes rotating the airfoil rotates a multiple of inlets of the inlet configuration with respect to a multiple of mask inlets of the fixed mask inlet configuration.

A system for a gas turbine engine according to one disclosed non-limiting embodiment of the present disclosure includes a trunnion rotatable about an axis, the trunnion having a trunnion inlet configuration; and a fixed airflow inlet mask to abut the trunnion, the fixed airflow inlet mask having a mask inlet configuration, rotation the trunnion inlet configuration with respect to the fixed airflow inlet mask operable to change an effective flow into the trunnion.

A further embodiment of any of the foregoing embodiments of the present disclosure includes that the trunnion is an airfoil trunnion.

A further embodiment of any of the foregoing embodiments of the present disclosure includes that the trunnion inlet configuration comprises a multiple of inlets.

A further embodiment of any of the foregoing embodiments of the present disclosure includes that the mask inlet configuration comprises a multiple of mask inlets.

A further embodiment of any of the foregoing embodiments of the present disclosure includes that the fixed airflow inlet mask extends from the vane platform.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a schematic view of the modulated cooling flow system in an example climb position.

FIG. 8 is a schematic view of the modulated cooling flow system in an example cruise position.

DETAILED DESCRIPTION

Figure 1:
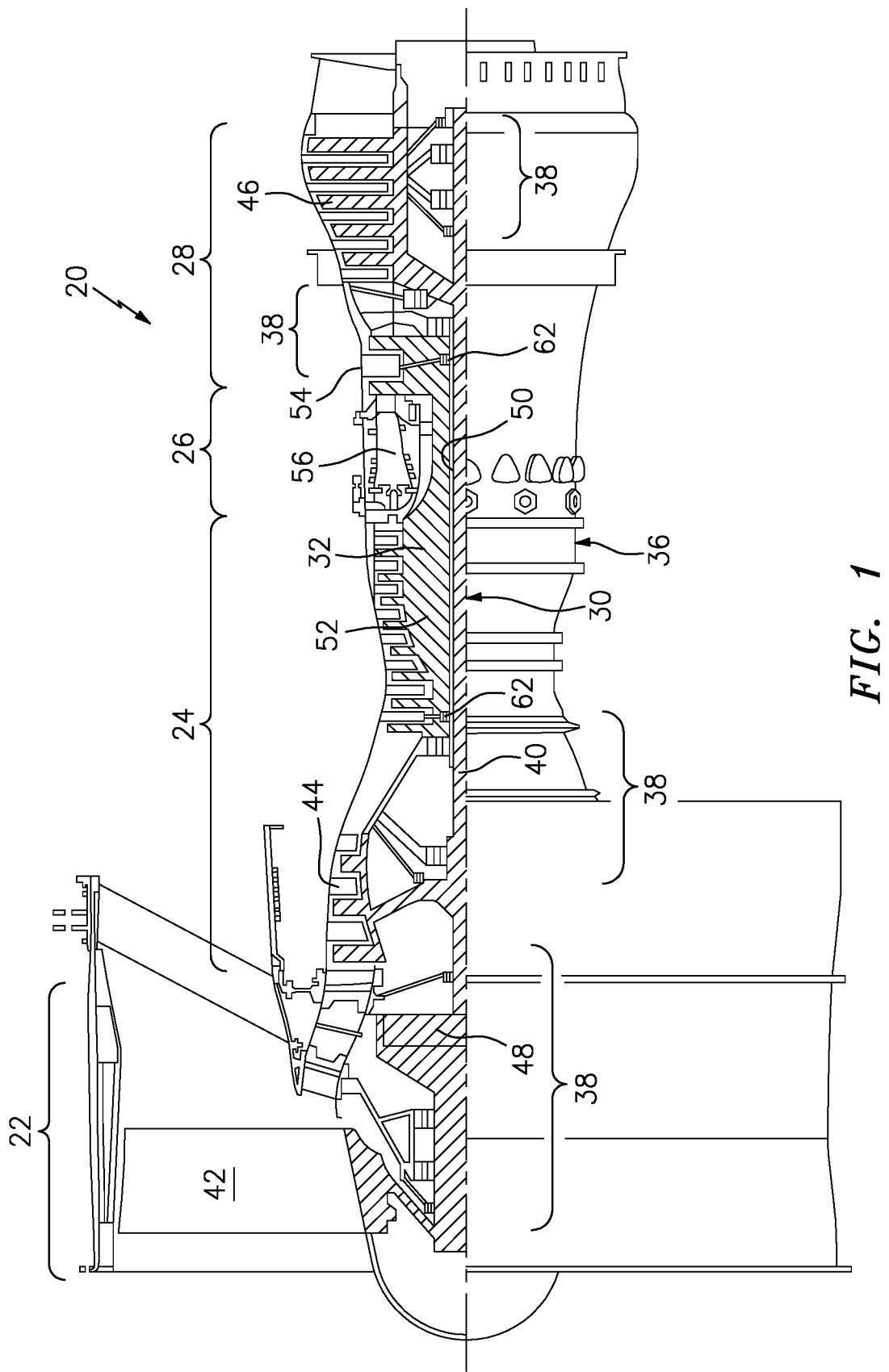
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26, and a turbine section 28. The fan section 22 drives air along a bypass flowpath and along a core flowpath for compression by the compressor section 24, communication into the combustor section 26, then expansion through the turbine section 28. Although depicted as a turbofan, it should be appreciated that the concepts described herein may be applied to other types of engine architectures.

The engine 20 generally includes a low spool 30 and a high spool 32 mounted for rotation about an engine central longitudinal axis "A." The low spool 30 generally includes an inner shaft 40 that interconnects a fan 42, a low pressure compressor ("LPC") 44, and a low pressure turbine ("LPT") 46. The inner shaft 40 drives the fan 42 directly, or through a geared architecture 48 at a lower speed than the low spool 30. An exemplary geared architecture 48 is an epicyclic transmission, such as a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis "A." The shafts 40, 50 are supported at a plurality of points by bearing structures 38 within the engine case structure 36.

Core airflow is compressed by the LPC 44, then the HPC 52, mixed with the fuel and burned in the combustor 56, then expanded over the HPT 54, then the LPT 46. The HPT 54 then the LPT 46 rotationally drive the respective high spool 32 and low spool 30 in response to the expansion.

Figure 2:
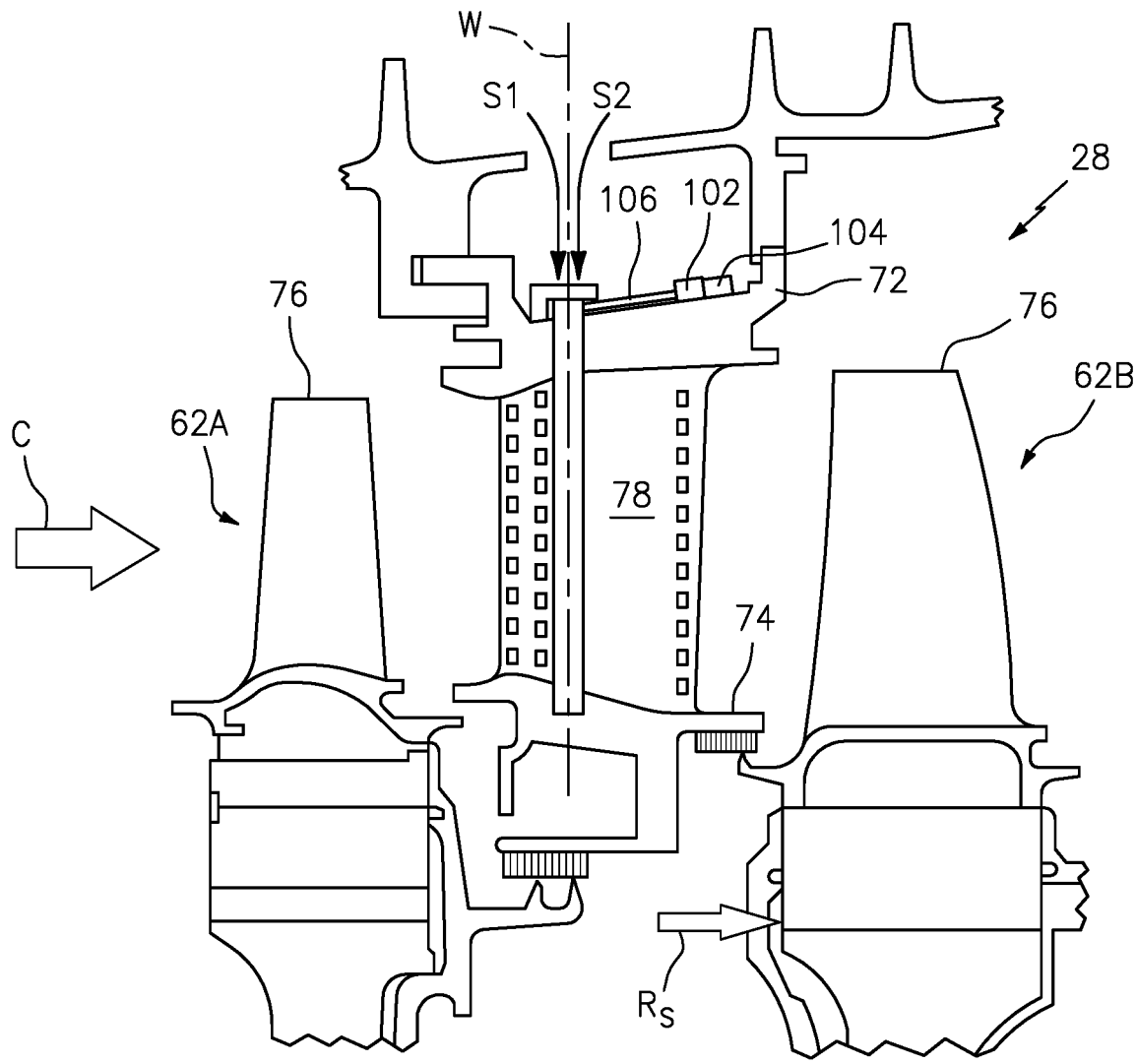
FIG. 2 is a partial exploded view of a vane ring of one turbine stage within a high pressure turbine section of the gas turbine engine, the vane ring formed from a multiple of vane segments.
Figure 3:
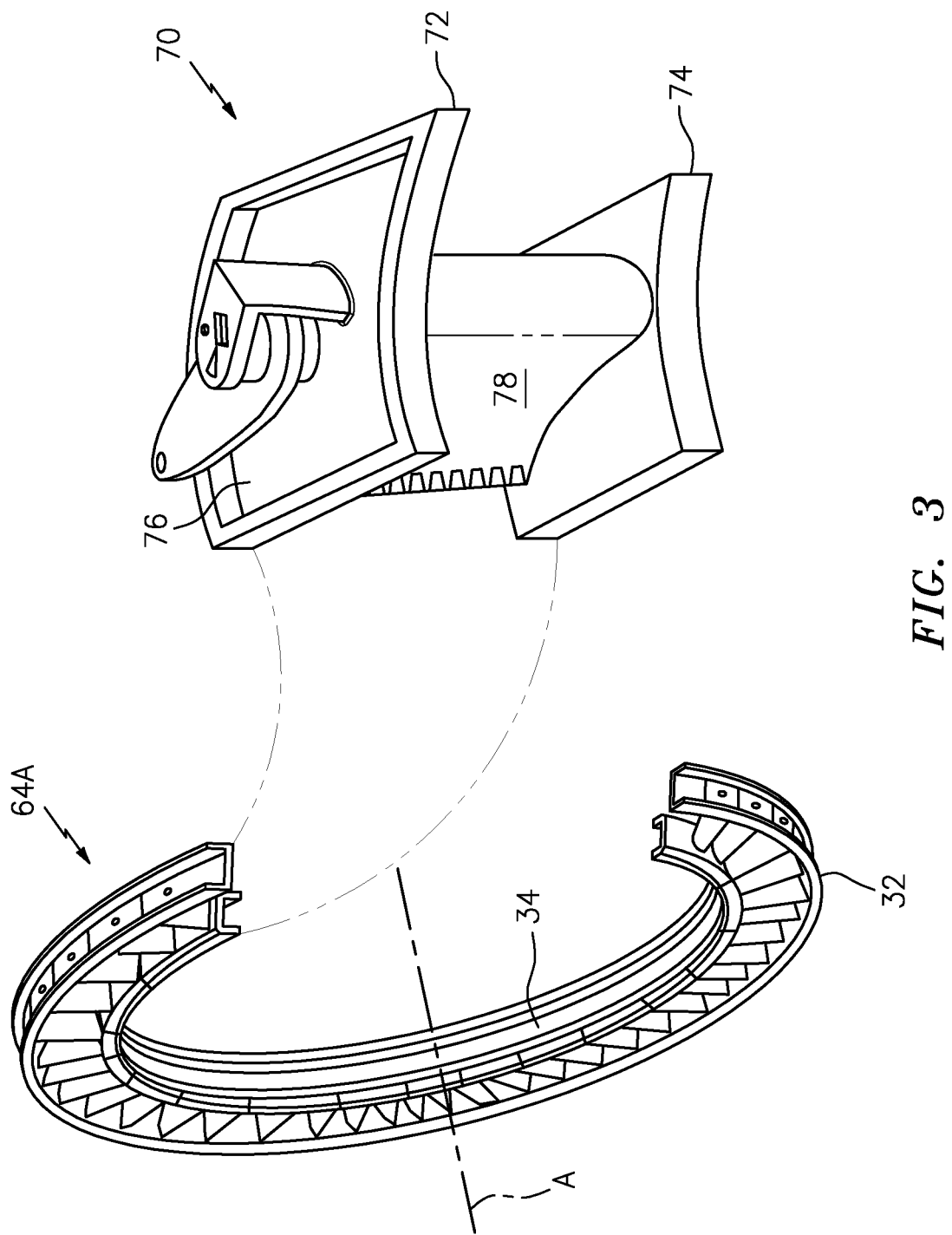
FIG. 3 is an exploded view of the vane ring showing one vane segment.

With reference to FIG. 2, an enlarged schematic view of a portion of the turbine section 28 is shown by way of example; however, other engine sections will also benefit herefrom. A vane 70 (also shown in FIGS. 3 and 4) includes an outer vane platform 72 and an inner vane platform 74 radially spaced apart from each other by the vane airfoil 78. The arcuate outer vane platform 72 may form a portion of an outer core engine structure and the arcuate inner vane platform may form a portion of an inner core engine structure to at least partially define an annular turbine nozzle core airflow flow path (FIG. 3).

The adjacent vanes 70 may be sealed therebetween, with, for example only, spline seals. That is, the temperature environment of the HPT 54 and the substantial aerodynamic and thermal loads are accommodated by the plurality of circumferentially adjoining nozzle segments 70 which collectively form a full, annular ring 64A (also shown in FIG. 3) about the centerline axis A of the engine. It should be appreciated the any number of vane airfoils 78 may be included in each segment.

With reference to FIG. 1, the HPT 54 generally includes a multiple of stages. The HPT 54 includes a multiple of rotors (two shown; 62A, 62B) interspersed with a vane ring (one shown; 64A). Each of the rotors 62A, 62B and the vane ring 64A, include their respective airfoils 76, 78 within the core flow path. It should be appreciated that any number of stages will benefit herefrom and although schematically depicted as the HPT 54 in the disclosed embodiment, it should also be appreciated that the concepts described herein are not limited to use with high pressure turbines as the teachings may be applied to other sections such as low pressure turbines, power turbines, intermediate pressure turbines as well as other cooled airfoil structures with any number of stages.

Figure 4:
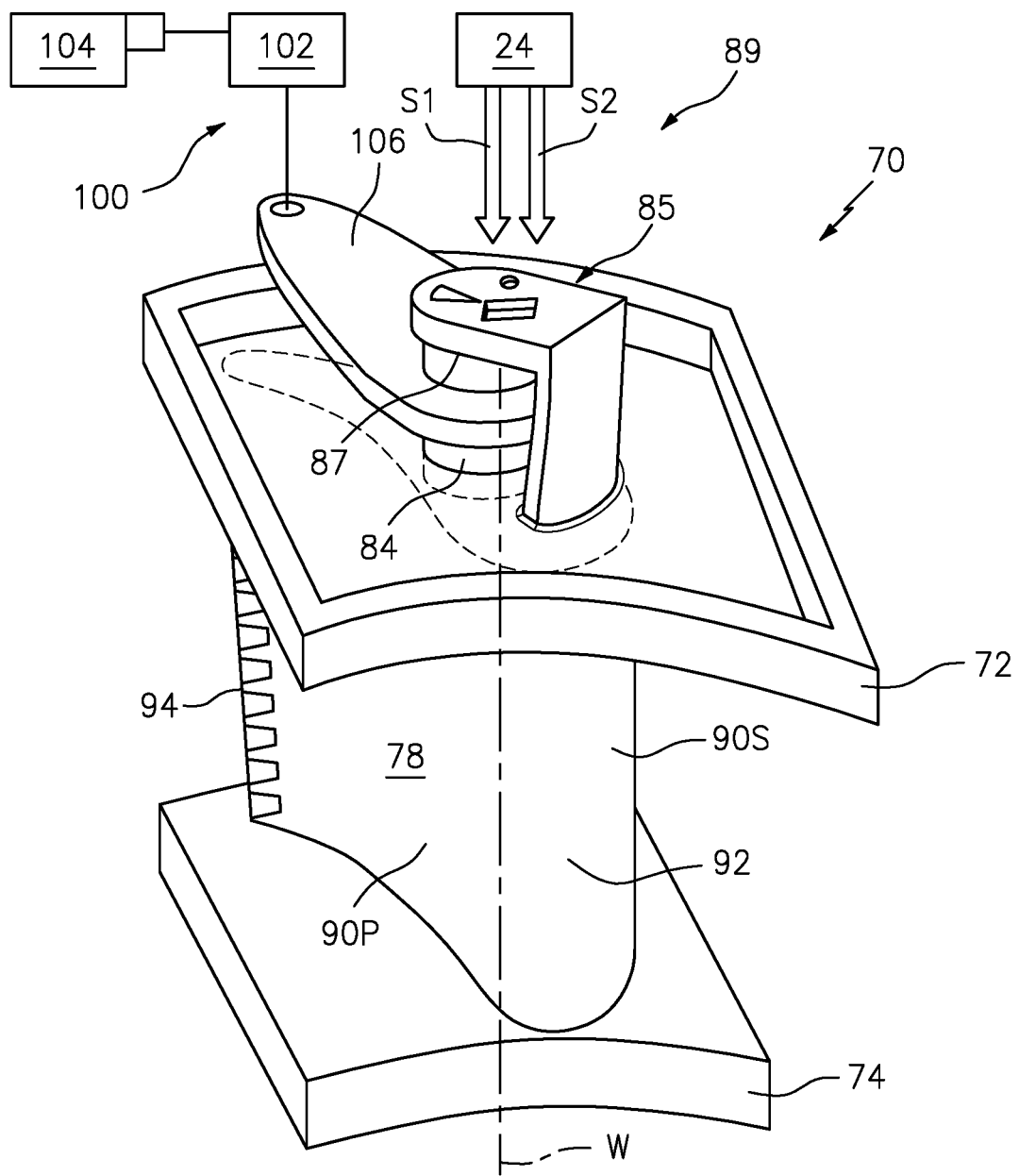
FIG. 4 is an expanded view of one vane segment.

With reference to FIG. 4, each vane airfoil 78 includes an airfoil trunnion 84 with a respective outer portion that extends through the outer vane platform 72 and an inner portion that is received into a corresponding socket in the inner vane platform 74. Each airfoil 78 is defined by an outer airfoil wall surface 90 between the leading edge 92 and a trailing edge 94. The outer airfoil wall surface 90 defines a generally concave shaped portion forming a pressure side 90P and a generally convex shaped portion forming a suction side 90S.

Figure 5:
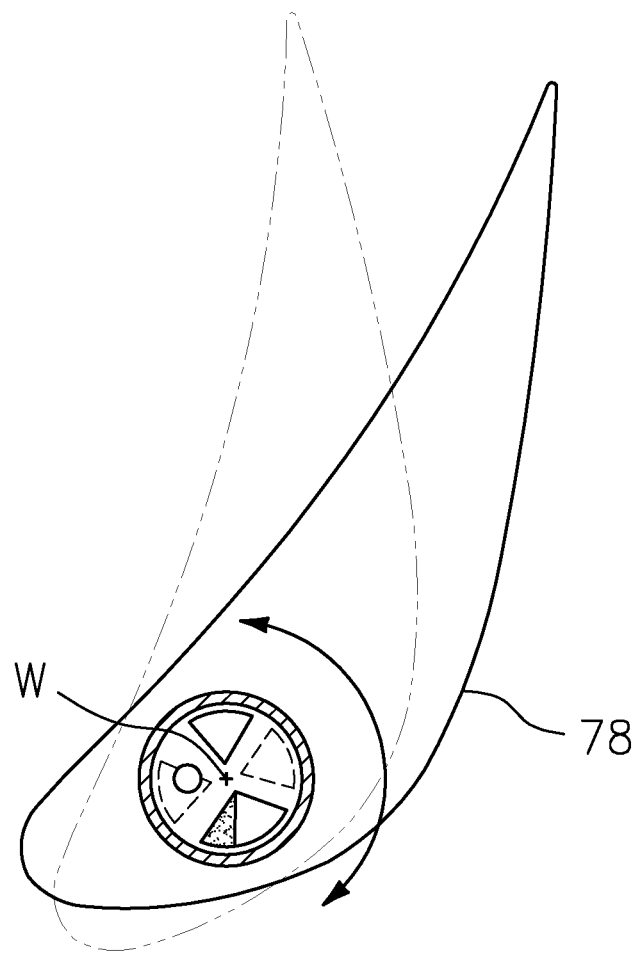
FIG. 5 is a sectional view of the turbine vane in various positions showing the modulated cooling flow system.

A variable vane system 100 rotates each airfoil trunnion 84 that extends from the vane airfoil 78 such that each vane airfoil 78 can be rotated with respect to the vane platforms 72, 74 about vane axis W (FIG. 5) for a particular flight condition and associated modulated cooling airflow. The variable vane system 100 may include a unison ring 102 attached to an actuator arm 106 that extends from each of the trunnions 84. An actuator 104 such as an electric motor or other device rotates the unison ring 102 and thereby all the vane airfoils 78 of the vane ring 64A. It should be appreciated that various linkages may additionally or alternatively be utilized.

Figure 6:
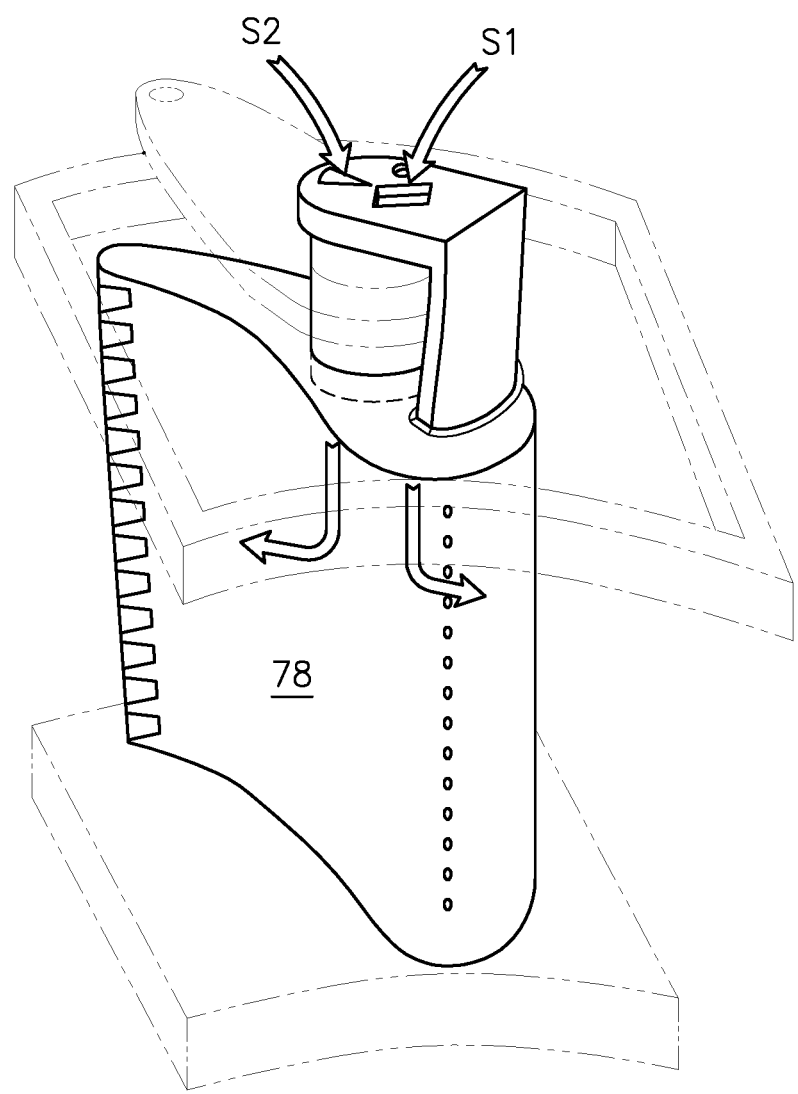
FIG. 6 is a perspective view of the turbine vane showing cooling airflow into the modulated cooling flow system.

A fixed airflow inlet mask 85 extends from the vane platform 72 to cover the airfoil trunnion 84. A seal 87 between the fixed airflow inlet mask 85 and the airfoil trunnion 84 may be utilized to seal the airfoil trunnion 84 during relative rotation. In one embodiment, the fixed airflow inlet mask 85 is generally an upside down "L" shape that extends from the vane platform 72 and abuts the top of the airfoil trunnion 84. Alternatively, the fixed airflow inlet mask 85 can be cast into the vane platform, or could be attached separately, e.g., bolted, welded, etc. The fixed airflow inlet mask 85 and the airfoil trunnion 84 form a modulated cooling flow system 89 that is operative in response to rotation of the airfoil 78 (FIG. 6).

The airflow inlet mask 85 (FIGS. 7 and 8) includes a mask inlet configuration 110 that may include one or more mask inlets 112a, 112b, 112c, . . . , 122n, defined around axis W. The airfoil trunnion 84 (FIGS. 7 and 8) includes a vane inlet configuration 120 that may include one or more vane inlets 122a, 122b, 122c, . . . 122n defined around axis W. The vane inlet configuration 120 may be different than the mask inlet configuration 110. That is, the mask inlets 112a, 112b, 112c, . . . , 122n, and the vane inlets 122a, 122b, . . . 122n may be of various sizes, shapes, and positions defined around axis W to control airflow in response to rotation of the airfoil 78 (FIG. 6).

The actuator 104 rotates the unison ring 102 which rotates the actuator arm 106 of each airfoil trunnion 84. This, in turn, rotates each vane airfoil 78. As each vane airfoil 78 is rotated for a particular flight condition, the airfoil trunnion 84 rotates with respect to the fixed airflow inlet mask 85 thereby controlling an airflow into the vane airfoil 78 to selectively vary cooling modulation to provide an effective flow inlet configuration between, for example, a climb position (FIG. 7) and a cruise position (FIG. 8). Climb is often a relatively demanding point for durability, but other points could be demanding such that an 'open' position is likewise desirable. Similarly, cruise is usually relatively less demanding than climb, but other flight points could be such a 'closed' position. The airfoil trunnion 84 may also be rotated to essentially minimize or eliminate cooling flow altogether. Although two distinct first and second secondary airflows S1, S2 (FIG. 6) from the compressor section 24 are illustrated in the disclosed embodiment, any number of cooling flows may be utilized. As defined herein the first and second secondary airflow source S1, S2 may be any relatively cooler airflow different than a core airflow.

Figure 9:
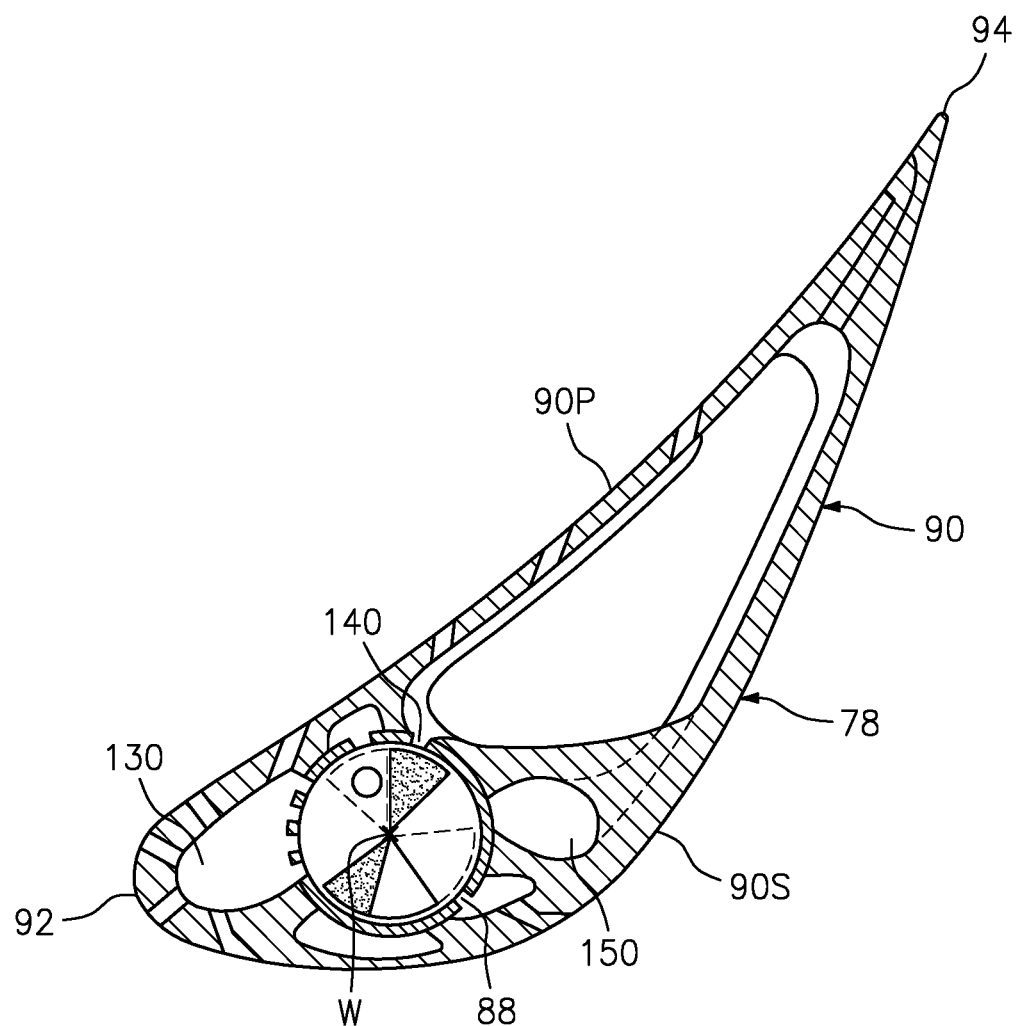
FIG. 9 is a schematic view of a turbine vane with modulated cooling according to another disclosed non-limiting embodiment.

In one disclosed non-limiting embodiment, a first cooling cavity 130 defines film cooling; a second cooling cavity 140 defines convective cooling and rotor purge feed; and a third cooling cavity 150 defines convective cooling (FIG. 9). Additional or alternative cavities may also benefit herefrom. The cooling cavities communicate cooling airflow through the vane airfoil 78, then into the downstream rotor 62B (illustrated schematically by arrows Rs; FIG. 3). Various inlets 122 may communicate with selected cavities 130, 140, 150 or portions thereof so that the first and second secondary airflow source S1, S2 communicate various quantities of cooling airflow through the modulated cooling system 89 in response to the vane airfoil 78 being rotated for the particular flight condition by the variable vane system 100.

In the example arrangement shown by FIG. 7, the variable vane system 100 provides a first flow of the effective flow that, across the vane ring 64A, may encompass approximately 1.0% of total engine cooling flow, and a second flow of the effective flow may be approximately 0.7% of total engine cooling flow. In the example arrangement shown by FIG. 8, the first flow of the effective flow, across the vane ring 64A, may encompass approximately may be 0.6% of total engine cooling flow, and the second flow of the effective flow may be may be 0.3% of total engine cooling flow. It should be appreciated that various mask inlet configurations and various vane inlet configurations may provide various cooling schemes. The ability to passively modulate cooling airflow facilitates in response to rotation by the variable vane system 100 allows for improved engine efficiency through the reduction of cooling flow to the vane at non-demanding flight points.

It should be appreciated that relative positional terms such as "forward", "aft", "upper", "lower", "above", "below", and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A variable vane system for a gas turbine engine, comprising:
   a vane platform;
   an airfoil;
   an airfoil trunnion that extends from the airfoil through the vane platform such that the airfoil is rotatable with respect to the vane platform about an axis, the airfoil trunnion having a trunnion inlet configuration into the airfoil; and
   a fixed airflow inlet mask to abut the airfoil trunnion, the fixed airflow inlet mask having a mask inlet configuration, rotation of the airfoil rotates the trunnion inlet configuration with respect to the fixed airflow inlet mask to change an effective flow into the airfoil, wherein the trunnion inlet configuration comprises a multiple of inlets and the mask inlet configuration comprises a multiple of mask inlets.

2. The system as recited in claim 1, further comprising a seal between the fixed airflow inlet mask and the airfoil trunnion.

3. The system as recited in claim 1, wherein at least one of a multiple of cavities within the airfoil comprises an airfoil cavity that ejects cooling flow to the gaspath via film cooling.

4. The system as recited in claim 1, wherein at least one of a multiple of cavities within the airfoil comprises a cooling cavity that provides airfoil cooling utilizing convective heat transfer.

5. The system as recited in claim 1, wherein at least one of a multiple of cavities within the airfoil comprises a rotor purge feed cavity.

6. The system as recited in claim 1, wherein the fixed airflow inlet mask extends from the vane platform.

7. A method of modulating an airflow for a gas turbine engine, comprising:
   rotating an airfoil with respect to a vane platform about an axis; and
   rotating a trunnion inlet configuration with respect to a fixed airflow inlet mask to change an effective flow into the airfoil in response to rotating the airfoil wherein rotating the airfoil rotates a multiple of inlets of the inlet configuration with respect to a multiple of mask inlets of the fixed mask inlet configuration.

8. The method as recited in claim 7, wherein rotating the airfoil comprises rotating an airfoil trunnion that extends from the airfoil.

9. The method as recited in claim 8, wherein rotating the airfoil trunnion comprises rotating a unison ring connected to an arm, the arm connected to the trunnion.

10. The method as recited in claim 8, further comprising communicating airflow from the airfoil trunnion into one of a multiple of cavities within the airfoil.

11. The method as recited in claim 8, wherein rotating the airfoil trunnion rotates the trunnion inlet configuration with respect to the fixed mask inlet configuration.

12. The method as recited in claim 7, wherein rotating the airfoil rotates a multiple of inlets of the inlet configuration with respect to a multiple of mask inlets of the fixed mask inlet configuration.

13. A system for a gas turbine engine, comprising:
a trunnion rotatable about an axis, the trunnion having a trunnion inlet configuration; and
a fixed airflow inlet mask to abut the trunnion, the fixed airflow inlet mask having a mask inlet configuration, rotation the trunnion inlet configuration with respect to the fixed airflow inlet mask operable to change an effective flow into the trunnion, wherein the trunnion inlet configuration comprises a multiple of inlets and the mask inlet configuration comprises a multiple of mask inlets.

14. The system as recited in claim 13, wherein the trunnion is an airfoil trunnion.

15. The system as recited in claim 13, wherein the fixed airflow inlet mask extends from the vane platform.

* * * * *